United States Patent [19]

Kollross

[11] Patent Number: 4,694,537
[45] Date of Patent: Sep. 22, 1987

[54] PROCESS AND DEVICE FOR THE FIXTURE OF SUSPENSION ELEMENTS TO SAUSAGES

[76] Inventor: Günter Kollross, Am Wallerstädter weg 20, D-6080 Gross Gerau-Dornheim, Fed. Rep. of Germany

[21] Appl. No.: 759,137

[22] Filed: Jul. 26, 1985

[30] Foreign Application Priority Data

Aug. 16, 1984 [DE] Fed. Rep. of Germany .......................... 3430030923

[51] Int. Cl.$^4$ .............................................. A22C 11/12
[52] U.S. Cl. ........................................... 17/49; 17/34; 17/444
[58] Field of Search ...................... 17/34, 44.4, 49, 33, 17/1 R

[56] References Cited

U.S. PATENT DOCUMENTS

| | | | |
|---|---|---|---|
| 3,306,184 | 2/1967 | Hanau | 17/34 X |
| 3,454,980 | 7/1969 | Washburn | 17/35 |
| 3,483,801 | 12/1969 | Kupcikevicius | 17/34 X |
| 4,044,450 | 8/1977 | Raudys et al. | 17/44.2 X |
| 4,227,668 | 10/1980 | Ernst | 17/44.2 X |

FOREIGN PATENT DOCUMENTS 2803511 8/1979 Fed. Rep. of Germany .......... 17/34

Primary Examiner—Willie G. Abercrombie
Attorney, Agent, or Firm—Larson and Taylor

[57] ABSTRACT

The process and device for the fixture of suspension elements, particularly suspensions loops, to sausages by means of sealing components, e.g. clamps. The sausage sheath is be restricted by a binding tool (12) which can be set to three positions. The binding tool (12) is open in the initial position between two sausage filling processes so that a suspension loop (16) can be fed through the opening (48). During the sausage filling process an intermediate position is adopted in which one part (54) of the binding tool holds the suspension loop (16). The binding tool (12) is closed in the shape of a ring at least during the filling procedure for large calibers of sausage. Subsequent to the filling process the binding tool then executes the binding movement.

15 Claims, 10 Drawing Figures

PROCESS AND DEVICE FOR THE FIXTURE OF SUSPENSION ELEMENTS TO SAUSAGES

The invention relates to a process for the fixture of suspension elements, in particular suspension loops, to sausages by means of the sealing components such as clamps placed on the ends of the sausage following the filling processes for the purpose of sealing the sausage sheath, whereby a suspension element held by the binding tool, each time before binding the sausage sheath at the sealing point, is guided to the longitudinal axis of the sausage during the binding procedure and is enclosed by the sealing component together with the bound sausage sheath, as per German Pat. No. 33 22 759.4. The invention further relates to a suitable device for the execution of this process.

It is general knowledge that suspension loops are to be led under the sealing clamps and clamped firmly up against the bound sausage sheath when the sausage is sealed. The above noted patent describes a process and a device wherein a part of the binding tool engages in a suspension loop advanced into its operational path in the course of the binding process and carries this along the longitudinal axis of the sausage, whereby the sealing clamp then grasps through the suspension loop whilst enclosing the bound sausage sheath, so that it is affixed reliably to the sausage.

Sausages of extremely varying caliber are frequently manufactured on automatic sausage filling machines. When doing so the same binding tools should be used throughout so that tools do not have to be constantly changed. The binding tools normally consist of two interacting, essentially V-shaped displacement shear arms, which are either mounted pivotably as in the patent quoted or as shown for example in the U.S. Pat. No. 3,454,980, and can be guided between two straight guidance tracks. As the displacement shear arms consist of relatively thin sheet-metal, preference should be given to two-sided guidance of the displacement shear arms for larger sausage calibers of the latter design.

During the sausage filling process the displacement shear arms assume a position pivoted wide apart or driven apart since the sausage has to be forced through the binding tool located in front of the filling tube outlet. It has been established, however, that the binding tool does not have to be designed to be so large that it will encompass even the largest caliber of sausage without contact during the filling process. The sausage sheath is filled and drawn without fault even if the binding tool forms a point of restriction. The position assumed during the filling process can therefore have a clear cross-section which is smaller than the cross-section of the sausage. In this way space is gained and this saves on weight and tooling costs. In addition the friction of the sausage sheath on the binding tool increases effectiveness of the gut brake restraining the pulling-off of the sausage sheath from the filling tube. On the other hand this smallest possible design, measured against the largest caliber of sausage does, however, necessitate the binding tool's components forming a self-contained, usually polygonal ring, seen from the front elevation, even in the most extended position, possibly together with the lateral guidance tracks of the displacement shear arms, because should there be an opening in the periphery of the ring then the sausage compressed at the point of restriction would swell out laterally when being forced, be deformed and destroyed.

The basic purpose of the invention is to create a process and a suitable device for its execution, which permits working with a drawing-in tool which is as small as possible, which possibly forms a self-contained ring during the filling process, which, however, permits suspension elements being fixed to the sausage sheath by means of the sealing components in the same way as in the German patent quoted above.

The latter objective is solved in accordance with the invention in that the suspension element is already grasped by the binding tool before the filling process and is held during this filling process.

The invention requires that the binding tool's components assume three different positions in sequence during the operating cycle at least for large calibers, namely initially an outlet point with a lateral opening, through which the suspension element can be passed radially, then during the filling process a position which is in fact spread but in itself ring-shaped and finally the internal end point achieved at the end of the binding process in which the suspension element is so held on the bound sausage sheath that it passes through and grips this enclosing sealing component via a loop, a ring or a hook-shaped jaw which forms the suspension element. Surprisingly, it has been shown that neither the filling of the sausage sheath nor the fixture of the suspension element is disturbed by the fact that the sausage sheath slides along the suspension element which has already been placed in the binding tool during the filling process.

In the preferred design of the process a guidance element engages in the same position of the suspension element in which it is grasped by the binding tool, this guiding the suspension element to a curing or cooking bar when the sausage is transported further.

The design foreseen for the execution of the new process described above according to the invention consists of a movable binding tool with interacting displacement shear arms located in front of the filling tube opening of an automatic sausage filler between an outlet point which is open at the circumference and an internal end position which presses the sausage sheath together tightly, furthermore of a sealing device acting on the bound point of the sausage sheath's sealing component, as well as of a conveying device transporting suspension elements individually into the moving area of a part of the binding tool, wherein the binding tool has an intermediate position apart from the initial open position assumed before each filling process and apart from the internal end position which is adopted by a sausage during the filling process, whereby the suspension elements are accessible in the transition from the initial position to the intermediate position.

The three binding tool positions quoted can be adjusted equally well independent of the sausage caliber. Adjustment of the binding tool can be so controlled without further problems so that the intermediate position adopted during the filling process varies with the caliber of the sausage.

As far as is known for binding tools with straight running displacement shear arms these were always guided until now on two sides on guide tracks throughout, i.e. these binding tools formed a cyclically expanding and contracting yet constantly closed, polygonal ring throughout the sequence of operating cycles. It is a peculiarity of the invention that it has departed from the closed, ring-shaped design for binding tools with straight displacement shear arms and proposes that one of the guidance tracks of the displacement shear arms be interrupted in the central area, thus forming an opening through which suspension elements can be introduced into the binding tool radially when the displacement shear arms have been driven apart. In order to maintain the two displacement shear arms wide apart during the filling process even after introduction of a suspension element into the binding tool and be able to close it in a ring-shape, it is foreseen that the opening be sealable and use a bar-shaped component which is slidable along the length of the guide track on the one guidance track during the transition from the initial to the intermediate position, this component penetrating the suspension element during the closing movement. The bar-shaped part on the binding tool quoted should preferably have an independent drive from the displacement shear arm drive but can alternatively be secured to one of the displacement shear arms which is movable as a first step from the initial position which exposes the opening into the intermediate position which closes the opening and as a second step from the intermediate position into the internal end position.

In a further preferred design version of the invention the free end of an elongated guidance element which guides the suspension elements to a curing or cooking bar is located to be so movable at the opening of the binding tool that it can be introduced into the suspension element which is extended into the binding tool. In this way the suspension element fixture proposed here can be combined with the direct transfer of the suspension elements to a cooking or curing bar described in the above quoted German patent.

The invention is explained in more detail using the following practical examples illustrated in the drawings. The following are shown:

Figure 1:
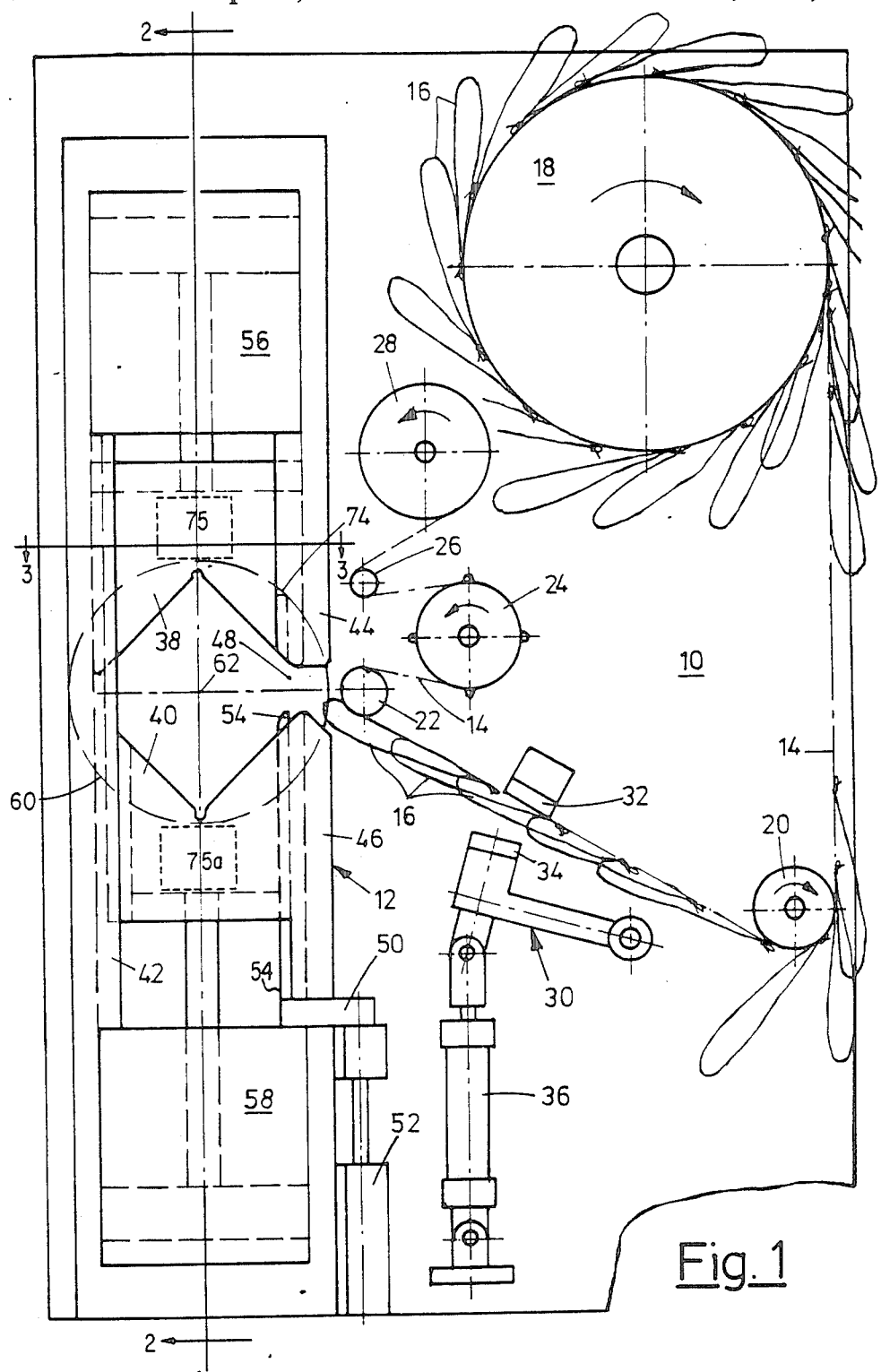
FIG. 1 is a device in side elevation to be attached to an automatic sausage filler for binding and sealing the sausage sheath with simultaneous attachment of a suspension loop, whereby the individual components of the device are shown in the initial open position.
Figure 2:
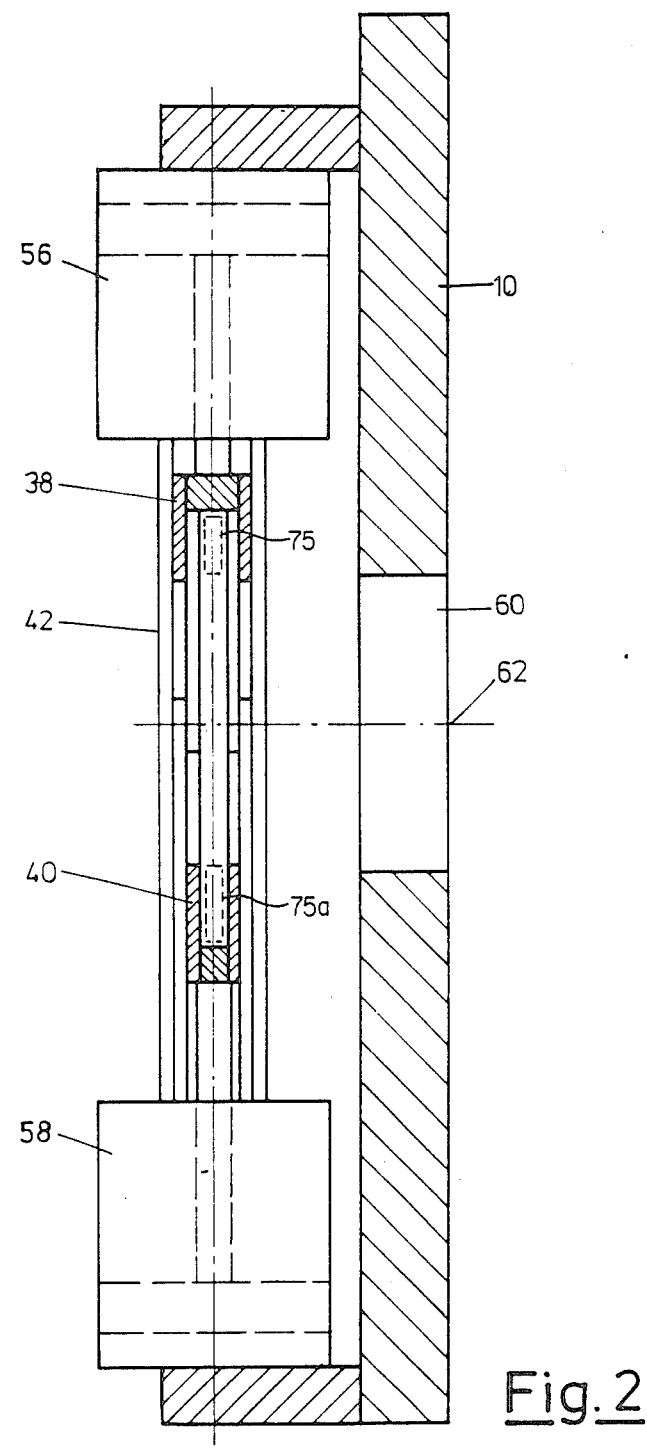
FIG. 2 is a longitudinal section taken through line 2—2 of the binding tool shown in FIG. 1.
Figure 3:
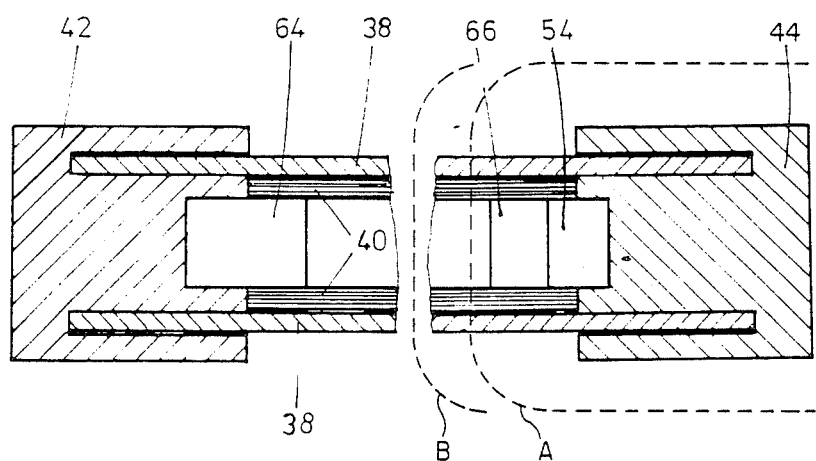
FIG. 3 is a cross-section taken through line 3—3 of the binding tool as per FIG. 1.

Reference is made initially to FIG. 1 to 3. the device shown there is secured to a base plate 10 to be affixed in front of the filling tube opening of an automatic sausage filler and consists in total of a binding tool, referred to also as a sausage constricting tool". 12 combined with a generally known, and therefore non illustrated tool component for the application of sealing as well as of an apparatus consisting of several rollers for feeding suspension loops 16 fixed to a loop strip 14. For convenience, the two cooperating parts of the well known tool component for the application of sealing clamps, which is located between and movable with the sausage constricting mechanism, are shown schematically at 75 and 75a in FIGS. 1 and 2. During operation the loop strip 14 is drawn off of storage roller 18 together with the suspension loops 16 affixed to it, fed via a pulley 20, then via a further pulley 22 directly next to binding tool 12 to a drive roller 24 which can be advanced step by step, preferably fitting positively into the strip which has in the meantime been freed of suspension loops and from there fed via a further pulley 26 to a take-up roller 28 where the empty strip is wound up. A clamping device designated in total by 30 is located between the pulleys 20 and 22, consisting of a fixed clamping jaw 32 and a movable clamping jaw 34, between which the loop strip 14 can be firmly clamped, whilst a loop 16 can be drawn off strip 14 by the binding tool 12. Actuation of the movable clamping jaw 34 takes place in the case of the example by means of a pneumatic cylinder 36.

The binding tool 12 consists of an upper displacement shear arm 38 and a lower displacement shear arm 40. The displacement shear arms have been cut-back V-shaped on the opposed facing edges in the normal, known manner and are guided on both sides in guidance tracks, of which the left guidance track is designated by 42 with reference to FIG. 1. The latter runs throughout without interruption from top to bottom, whilst contrary to other binding tools of this type with displacement shear arms which can be driven straight the right guidance track is not continuous, referring to FIG. 1, but is subdivided into an upper guidance track 44 and a lower guidance track 46, between whose opposed facing ends an empty space exists which forms an opening 48 of binding tool 12. This opening can be closed by a bar 54 connected to an air cylinder via a slide valve 50 guided on guidance tracks 44 and 46, whilst the displacement shear arms 38 and 40 maintain the position shown in FIG. 1. During the binding process and reversing movement into the initial position as per FIG. 1 the upper displacement shear arm 38 is driven backwards and forwards by an air cylinder 56 and the lower displacement shear arm 40 by an air cylinder 58.

It can be seen from FIG. 2 that the two displacement shear arms 38 and 40 consist of 2 pieces of sheet-metal, cut-out V-shaped, firmly connected with one another, with axial spacing, whereby in the case of the example the two pieces of sheet-metal of the upper displacement shear arm 38 overrun the lower displacement shear arm 40 when the displacement shear arms are brought together during the binding process. The non-illustrated tool for application of the sealing clamps is located in commonly known manner between the displacement shear arms' parallel pieces of sheet-metal. Furthermore FIG. 2 shows a hole 60 in the base-plate 10 aligned with the central axis of the binding tool 12, which itself is flush with the automatic sausage filler's non-illustrated filling tube. During the sausage filling process the sausage is forced through hole 60 and through the empty space between displacement shear arms 38 and 40, referring to FIG. 2, from right to left. The longitudinal axis of the sausage and the device is designated in FIG. 1 and 2 by 62.

FIG. 3 illustrates the guidance of the displacement shear arms 38 and 40 and the bar 54 on the lateral guidance tracks 42 and 46 or 44. As can be seen both sheet-metal components of the displacement shear arm 38 are guided directly on both sides in appropriate grooves of the guidance tracks 42, 44, 46. The two sheet-metal components of the lower displacement shear arm 40 are firmly connected with one another by an intermediate piece 64 extending laterally over the sheet-metal components on the sides of the guidance track 42. The intermediate piece 64 is guided in an appropriate groove of the guidance track 42. An intermediate piece 66 is also firmly located on the sides of the guidance tracks 42 and 46 between the two sheet-metal components of the displacement shear arm 40. Together with the opposed facing surfaces of the sheet-metal components this forms a slot in which bar 54 is appropriately inserted which in turn is guided by an appropriate slot of guidance tracks 44 and 46.

The device described functions as follows:

Before a sausage filling process the components of the device described in FIG. 1 adopt the initial position illustrated in which the displacement shear arms 38 and 40 are withdrawn upwards or downwards, the bar 54 is also withdrawn downwards, so that the opening 48 remains open and a suspension loop 16 is located in front of opening 48. The clamping device 30 is open.

Figure 4:
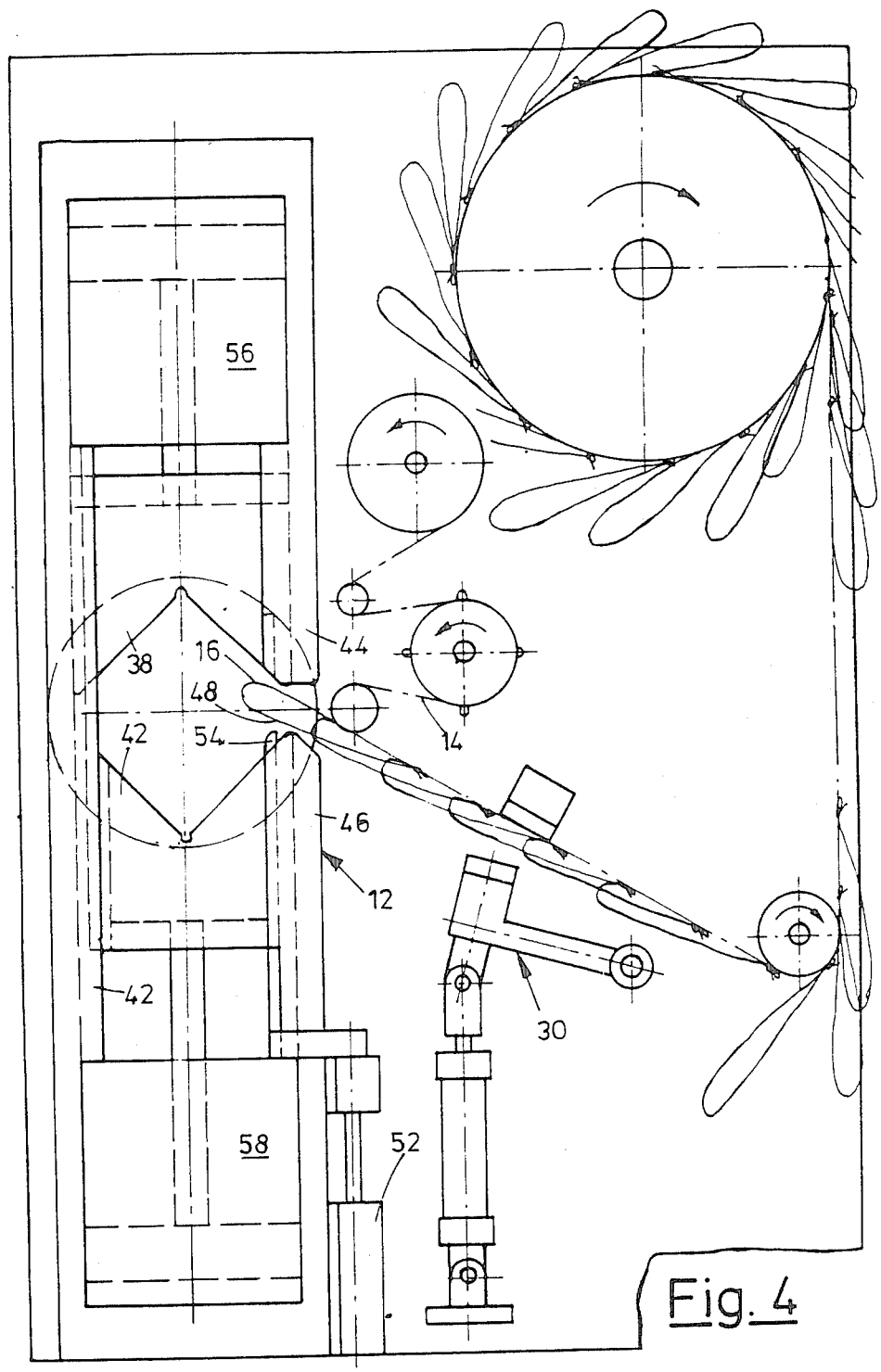
FIGS. 4 to 6 show elevations in accordance with FIG. 1 of the device in various positions during the operating cycle.

In the next step as per FIG. 4 the drive roller 24 has pulled the loop strip further on by one division. Thus loop 16 held in front of opening 48 as per FIG. 1 is pushed forward beyond the motion path of bar 54 into the motion area of displacement shears 38, 40.

Figure 5:
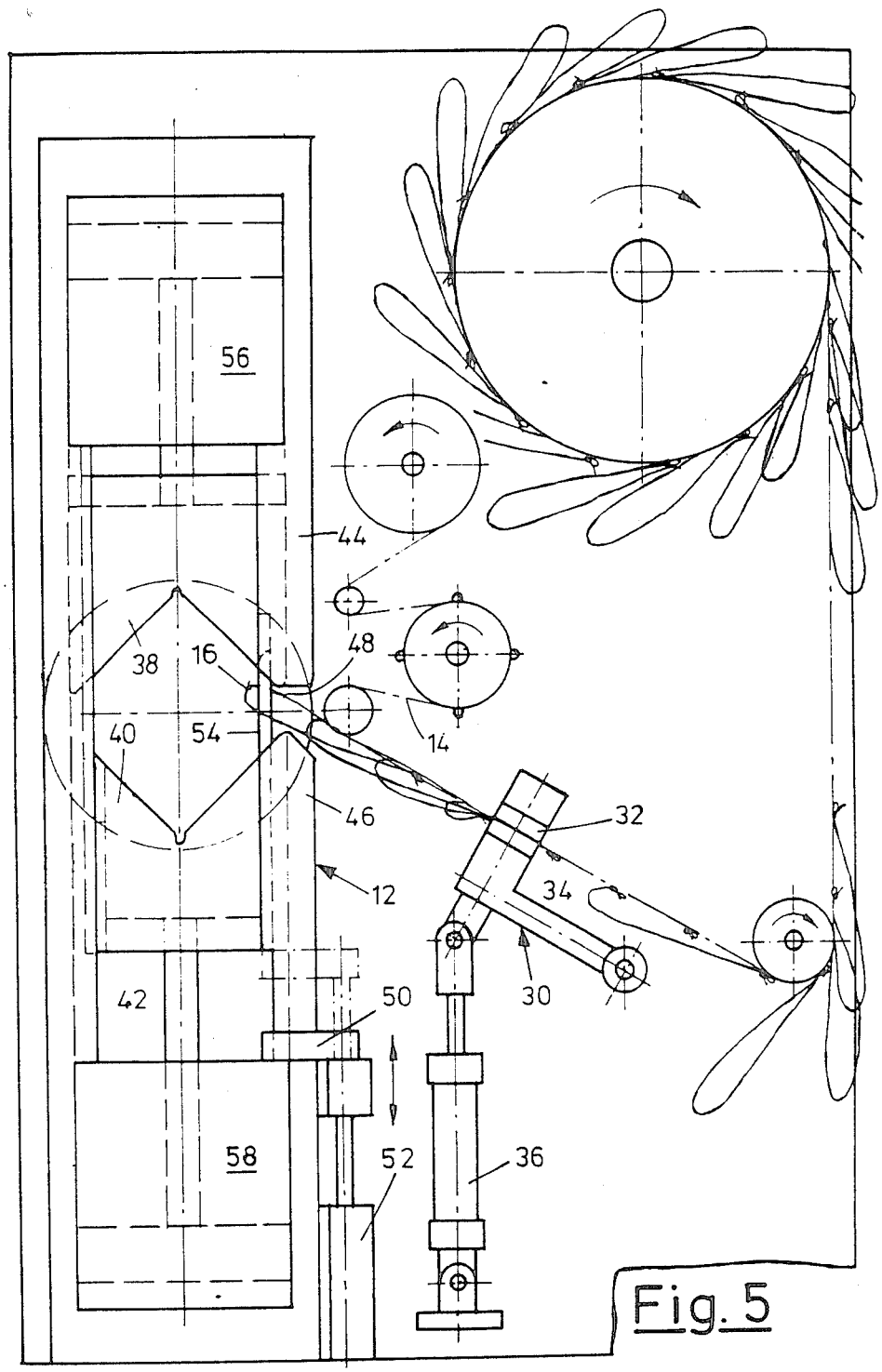
Figure 7:
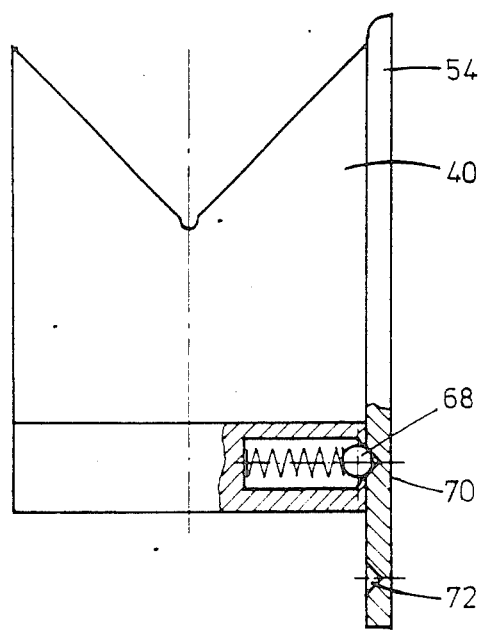
FIGS. 7 and 8 are detailed drawings of the binding tool of the device as per FIG. 1 to 6, in two different positions.
Figure 8:
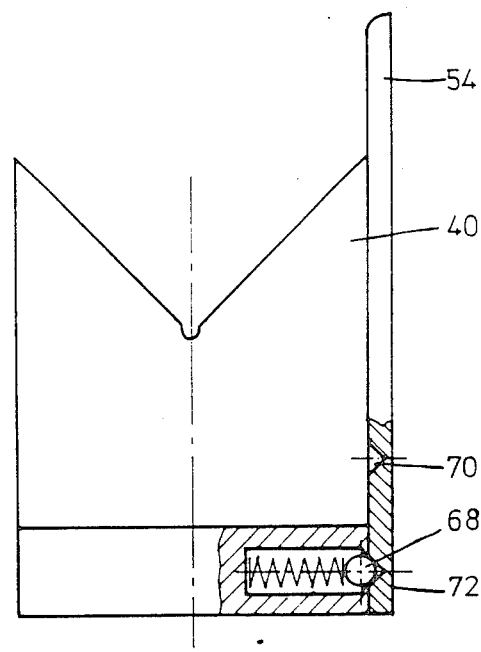

In the following operating step the air cylinder 52 pushes bar 54 upwards through loop 16, whereby this is held and opening 48 is closed. In the practical example the air cylinder 52 then returns immediately to its initial position as per FIG. 1. Bar 54 is, however, retained in its upper position by the arresting device shown in FIG. 7 and 8 which is described in greater detail below. Air cylinder 36 closes the clamping device 30 simultaneously with the closure of opening 48 so that the loop strip 14 is firmly clamped. In this position of the components as per FIG. 5, with the outermost part of the suspension positioned as shown at dotted line A in FIG. 3, the sausage filling process takes place.

Figure 6:
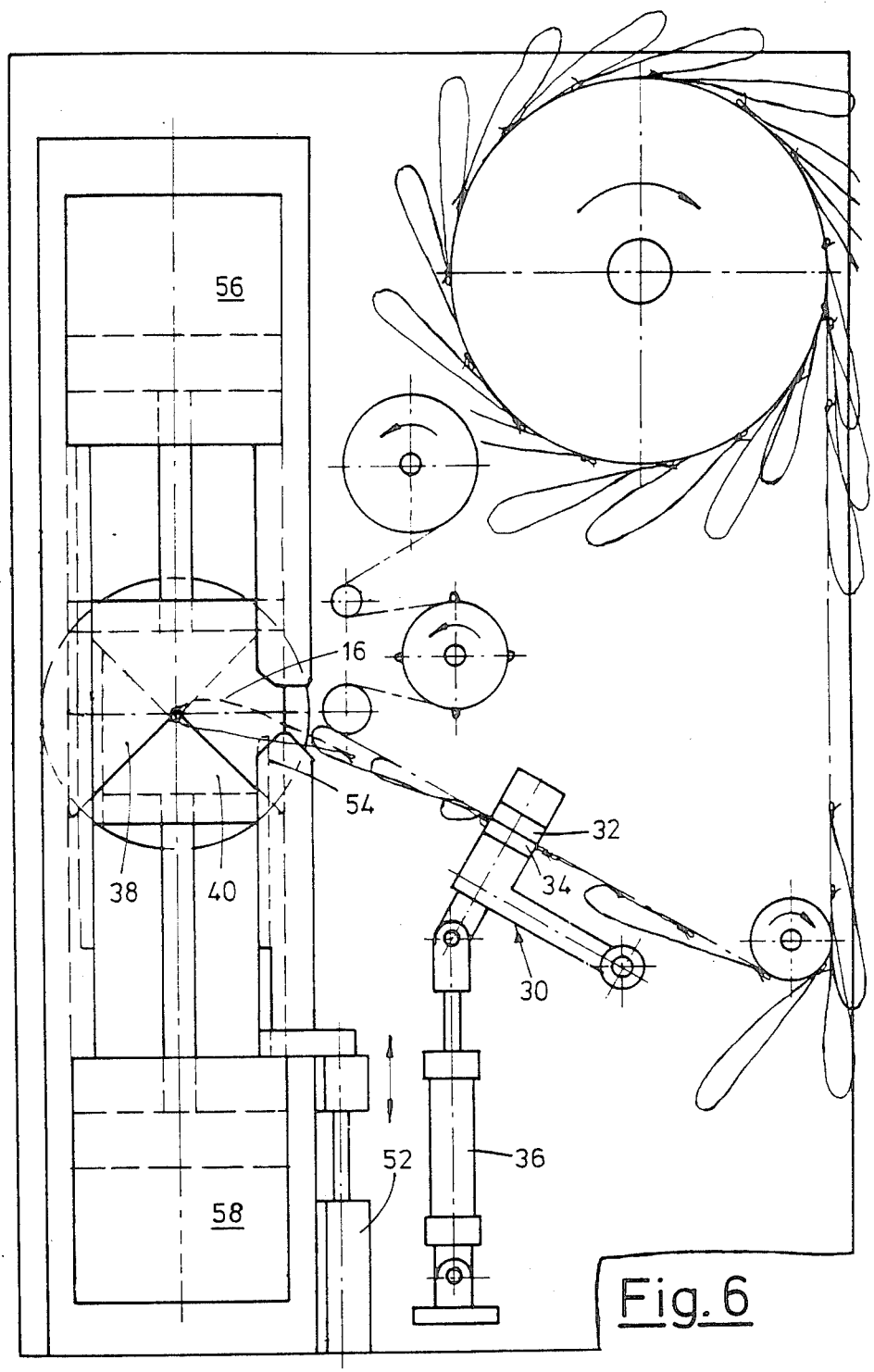

After the filling process the sausage sheath is bound together to a tight seal at the sealing point by means of binding tool 12, whereby the upper displacement shear arm 38 is run into its lower end position as shown in FIG. 6 by means of air cylinder 56 and the lower displacement shear arm 40 into its upper end position as per FIG. 6 by means of air cylinder 58. For this displacement shear arm movement the oblique edges of the V-shaped cut-outs which extend out to the right beyond bar 54 according to FIG. 3 and 5, bring the suspension loop 16 penetrated by bar 54 to the central longitudinal axis 62 as shown at dotted line B in FIG. 3. This loop is separated from the loop strip 14 to which it was welded or glued up until this point. This tensile forces occurring thereby are taken up by the closed clamping device 30.

Whilst the displacement shears 38, 40 maintain the sausage sheath compressed to a minimum cross-section as per FIG. 6 together with the suspension loops 16 separated from the loop strip, a clamp is applied by the known method by means of the non-illustrated sealing device which encloses the bound sausage sheath and passes through and grasps the suspension loop 16 thereby.

Subsequently the two displacement shear arms 38 and 40 are withdrawn to the initial position as per FIG. 1 by air cylinders 56, 58 respectively, whereby simultaneously opening 48 is recreated. This can be achieved either by firmly connecting bar 54 with the movable component of air cylinder 52 and its control in such a way that bar 54 is withdrawn by air cylinder 52 upon return of the binding tool into its initial position as per FIG. 1. The practical example as per FIG. 7 to 8 foresees as a simpler alternative that bar 54 is pushed upwards by air cylinder 52 via slide valve 50 in the phase lying between FIG. 4 and 5 (in FIG. 5 the upper position of slide valve 50 is drawn in dotted lines) and then is withdrawn again immediately together with slide valve 50 into the initial position as per FIG. 1. Bar 54 is relocated from the position as per FIG. 7 to the position as per FIG. 8 during this steadily executed backwards and forwards movement of air cylinder 52 relative to the lower displacement shear arm 40. Both positions are secured frictionally by a spring-loaded ball-bearing 68 restrained in a drill-hole in the displacement shear arm 40, which engages in a recess 70 in the position as per FIG. 7 and in a recess 72 in the position as per FIG. 8 located in bar 54. The pushing back of bar 54 relative to displacement shear arm 40 out of the position as per FIG. 8 into position as per FIG. 7 takes place by means of a stop face 74 on the upper displacement shear arm 38 which runs up against the free end of bar 54 and pushes this back so far that ball-bearing 68 reengages in the recession 70 during the binding movement of the displacement shears 38, 40 in the phase lying between FIG. 5 and FIG. 6. When the lower displacement shear arm 40 is then withdrawn from the position as per FIG. 6 into the initial position as per FIG. 1, it pulls bar 54 too into the initial position due to the clamping effect of arresting ball-bearing 68.

Figure 9:
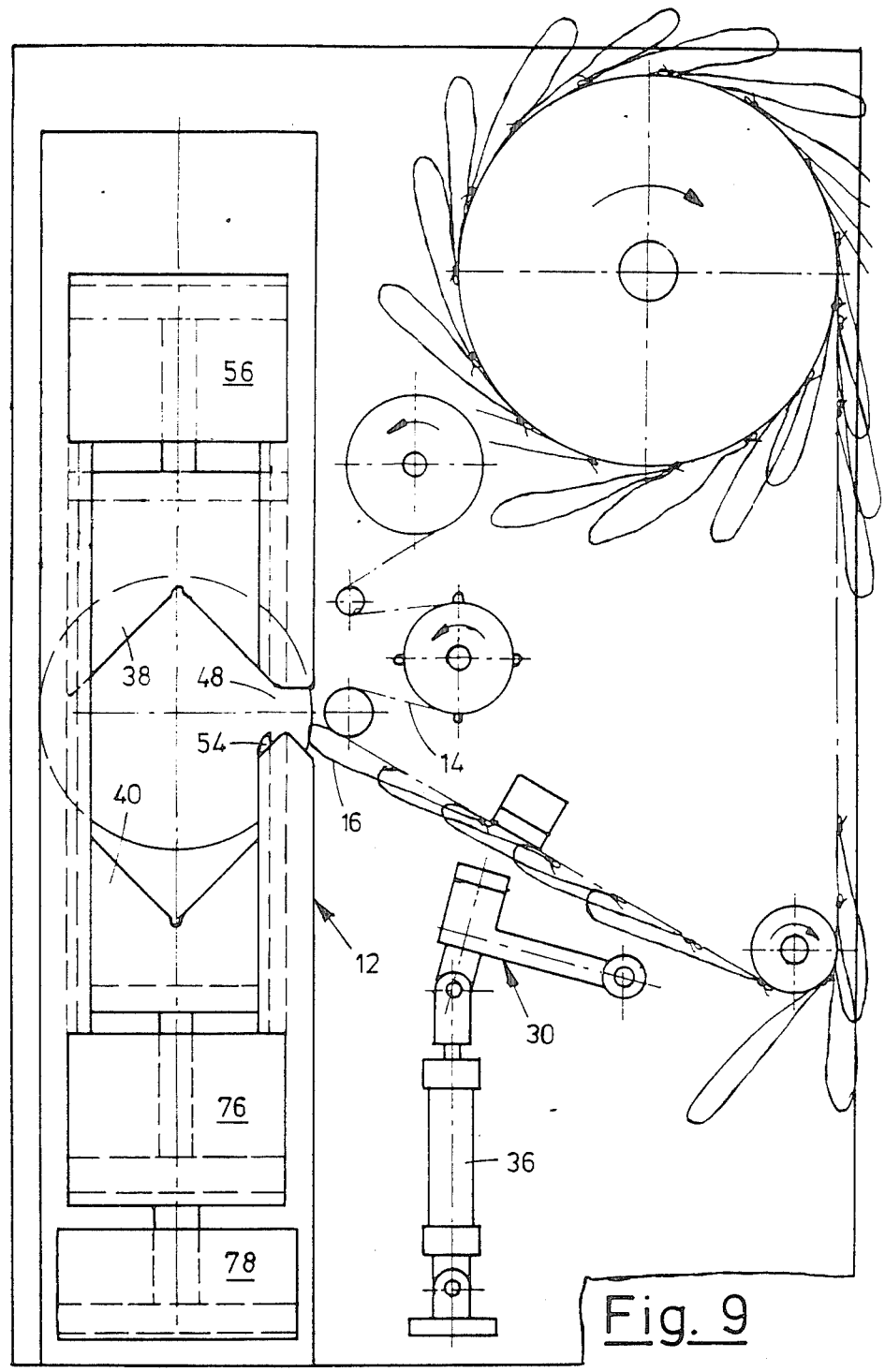
FIGS. 9 and 10 are elevations in accordance with FIG. 1 and 5 of a modified version.
Figure 10:
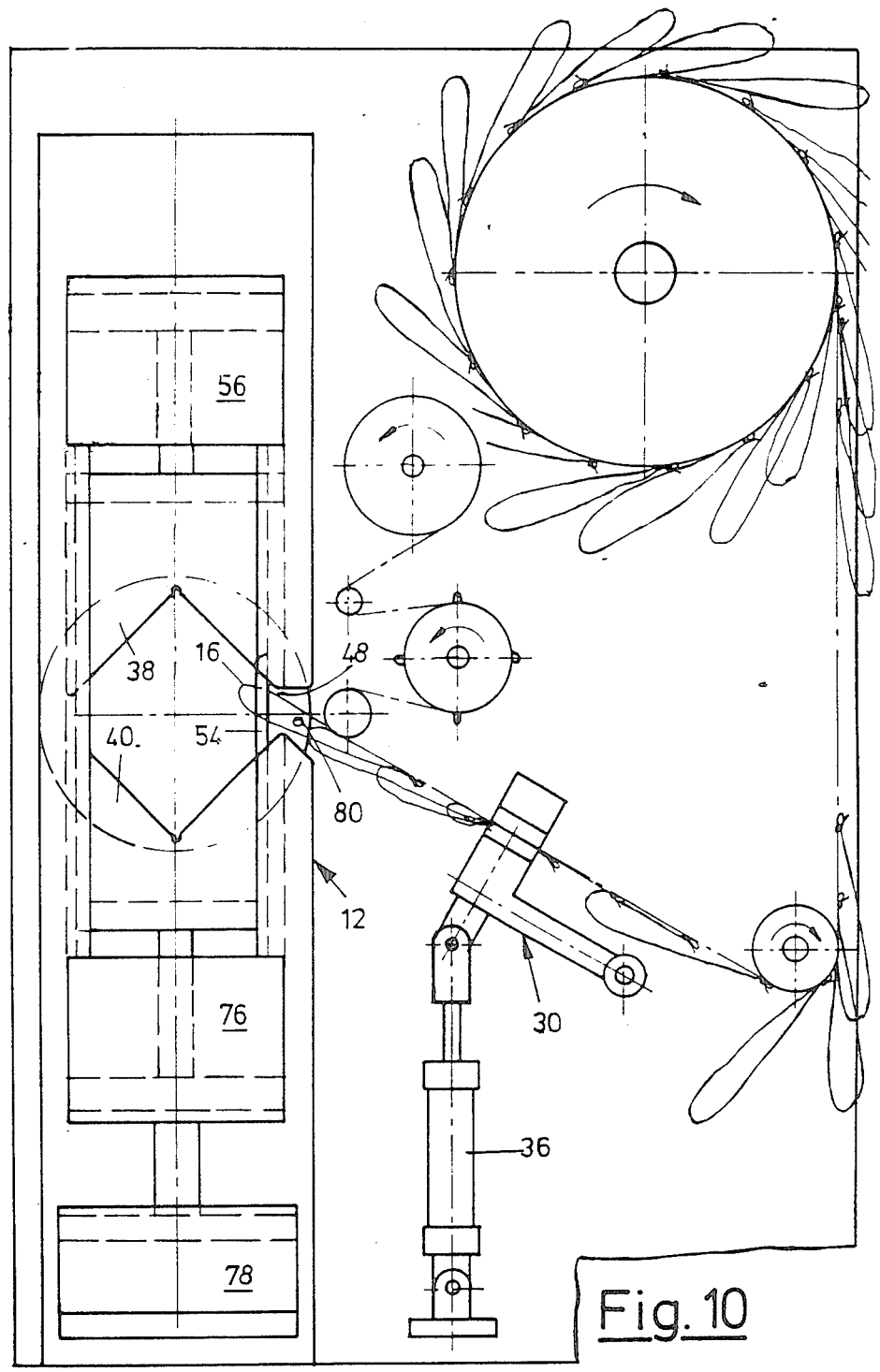

The version as per FIG. 9 and 10 differs from that as per FIG. 1 to 8 only by the drive of the lower displacement shear arm 40 and of bar 54. The latter is connected firmly with the lower displacement shear arm 40 in accordance with FIG. 9 and 10 and thus has been withdrawn downwards into the initial position as per FIG. 9 so far, which is incidentally in accordance with Fig. 1, that bar 54 allows access to opening 48. Displacement shear arm 40 and bar 54 form together with an air cylinder 76 a jointly slidable unit which can be pushed upwards by a further air cylinder 78 out of the position as per FIG. 9 into the position as per FIG. 10. In this position bar 54 closes the opening 48 whilst the binding tool with its displacement shear arms 38 and 40 is spread so far apart as is necessary for the sausage filling process. Subsequently the binding and sealing of the sausage sheath takes place in the manner described above, whereby the air cylinder 76 advances the lower displacement shear arm 40 in the internal end position illustrated in FIG. 6. Thereby the bar 54 forming a part of the lower displacement shear arm 40 also travels still further upwards, whereby, however, no additional effect occurs, since just as in the case of the practical example described first the suspension loop 16 is already held by bar 54 upon closure of opening 48. After sealing of the sausage sheath all air cylinders 36, 56, 76 and 78 return to the initial location shown in FIG. 9.

The invention in question represents a further development of the operating process described in German Pat. No. 33 22 759.4 with regard to the placement of the suspension loop in the binding tool which is temporarily open during each operating cycle. Independent of this the accomodation of the suspension loop described in the patent quoted is on a guidance element in conjunction with the fixture of the suspension loop to the sausage sheath and the subsequent transfer of the suspension loops via the guidance element to a curing or cooking bar. The device described in this application can of course be combined without difficulty with a guidance element of the same type as described in the older patent which guides the suspension loops to a curing or cooking bar. The bar shaped guidance element indicated in FIG. 10 by 80 can essentially for example be pushed through suspension loop 16 which has been pushed into the binding tool 12 simultaneously with bar 54.

Further it is obvious that the invention is not restricted to the practical examples with regard to shape and arrangement of the various component parts of the devices illustrated. The suspension elements whether thread loops, rings consisting in whole or in part of plastic, hooks or eyes made of similar elements can be arranged in another shape other than longitudinal direction on a strip, placed in a cartridge and fed to the binding tool 12. The suspension elements can for example overhang the lateral edge of a cartridge strip by the area which is grasped by bar 54. The clamping device 30 is to be designed or replaced depending on the choice of cartridge type and feed of the suspension elements.

As far as the binding tool 12 is concerned the invention is not dependent either on the shape of the edges effective during the binding process, or the number of shear components, their guidance or drive. Thus pivotably mounted shear levers as described in the older German patent quoted, amongst others, also come into question. It is, however, decisive that the binding tool is opened between sausage filling processes and then closes at least for large calibers for the duration of the sausage filling process in a ring shape in such a manner that this completely encloses the sausage sheath, whereby the suspension element is introduced radially, each time previous to the sausage filling process, into the binding tool which has been opened temporarily for this purpose.

I claim:

1. A method for attaching suspension elements to sausages by attaching them to a clamp, which is applied to the end of a sausage after the filing thereof, by a sausage constricting tool having relatively movable shear arms for constricting the sausage sheath, comprising the steps of:
    delivering a suspension element to the sausage constricting tool and grasping the suspension element by the sausage constricting tool at a grasped position before the filling of the sausage to which that suspension element is to be attached,
    and then guiding the suspension element from the grasped position to the longitudinal axis of the sausage, as the sausage constricting tool operates to constrict the sausage, and enclosing the suspension element together with the sausage sheath with the clamp.

2. A method according to claim 1, wherein before the step of filling the sausage, the sausage constricting tool is brought to an open position, at which the suspension element is inserted through an opening in the binding tool and ater which the sausage constricting tool is brought to an intermediate position in which a closed ring is formed, as viewed along the axis of the sausage.

3. A method according to claim 2, wherein before the step of filling the sausage, the sausage constricting tool is brought together to form a ring, as viewed along the axis of the sausage, whose cross sectional clearance is smaller than the cross section of the sausage being filled.

4. A method according to claim 2, wherein during transition of the sausage constricting tool from the open position into the ring-shaped, closed intermediate position the suspension element is moved to said grasped position and held there by a displacement shear component.

5. A method according to claim 2, wherein during transition from the open position to the ring-shaped closed intermediate position, the suspension element, at said grasped position, is grasped by an essentially bar-shaped component, forming a part of the ring and being movable relative to the shear arms of the binding tool.

6. A method according to claim 1, wherein at said grasped position a guidance element also engages the suspension element and guides the suspension element to a curing bar when the sausage is further transported.

7. A device for attaching suspension elements to sausages by attaching them, together with the sausage sheath within a clamp which clamps the end of the sausage, comprising:
    a sausage constricting tool having opposed, interacting displacement shear arms movable between an initial open position spaced apart from each other and having an opening along the side of the tool which leads to the space defined by the opposed, interacting shear arms, and an internal end position whereat the shear arms have moved towards each other to constrict the sausage sheath therebetween,
    said sausage constricting tool being located in front of the filling tube opening of a sausage filling machine, such that the sausage, as filled, moves into the space between the said opposed shear arms,
    means for applying a clamp to the sausage adjacent the shear arms,
    means for transporting the suspension element to the sausage constricting tool,
    said sausage constricting tool having an intermediate position other than said initial and internal end positions, in which intermediate position the sausage constricting tool grasps a sausage during the filling thereof,
    and said sausage constricting tool having means for grasping the suspension element transported to it as the sausage constricting tool moves from its said initial position to its said intermediate position and for moving the suspension element adjacent to the constricted sausage sheath as the sausage constricting tool moves from said intermediate position to said internal end position.

8. A device according to claim 7, wherein the components of the sausage constricting tool form a closed ring in the intermediate position, as viewed along the axis of the sausage.

9. A device according to claim 8, wherein the cross sectional clearance of the ring is smaller than the largest cross-section of the sausage to be constricted.

10. A device according to claim 7, wherein the sausage constricting tool comprises two V-shaped displacement shear arms guided by straight lateral tracks, one of which is interrupted in the central area, forming an opening through which suspension elements can enter into sausage constricting tool when the displacement shear arms are separated.

11. A device according to claim 10, wherein one of the guide tracks is closable by a bar-shaped component which is slidable along the guide track during the transition from the initial position to the intermediate position.

12. A device according to claim 11, wherein the bar-shaped component is fixed to a displacement shear arm which is movable in a first step from the initial position, which permits access to the opening, to the intermediate position in which the opening is closed, and in a second step from the intermediate position to the internal end position.

13. A device according to claim 11, wherein the bar-shaped component has a drive means operative independent of the drive means of the displacement shear arms.

14. A device according to claim 7, wherein the free end of the elongated guide element, which comprises a means for guiding the suspension elements to a curing bar, is located at an opening of the sausage constricting tool and such that it can be inserted into the suspension element which is being grasped by the sausage constricting tool.

15. A device according to claim 7, wherein the suspension elements are attached to a cartridge strip, means for feeding the strip, with the suspension elements thereon, to the opening of the binding tool in a step by step manner via guide rollers, and clamp jaw means for firmly clamping the strip when stationary during pulling off of a suspension element from the cartridge strip which takes place during the binding process.

* * * * *